United States Patent
Muehllehner et al.

(10) Patent No.: US 7,361,903 B2
(45) Date of Patent: Apr. 22, 2008

(54) IMAGE SYSTEM WITH NON-CIRCULAR PATIENT APERTURE

(75) Inventors: Gerd Muehllehner, Wayne, PA (US); Michael Geagan, Wayne, PA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 137 days.

(21) Appl. No.: 10/570,732

(22) PCT Filed: Sep. 1, 2004

(86) PCT No.: PCT/IB2004/051658

§ 371 (c)(1),
(2), (4) Date: Mar. 6, 2006

(87) PCT Pub. No.: WO2005/023113

PCT Pub. Date: Mar. 17, 2005

(65) Prior Publication Data

US 2006/0261276 A1    Nov. 23, 2006

(51) Int. Cl.
*G01T 1/00* (2006.01)

(52) U.S. Cl. .................... 250/370.09; 250/370.08; 378/203

(58) Field of Classification Search ............. 250/363.1, 250/363.02, 370.09, 370.08; 378/4, 15, 203
See application file for complete search history.

(56) References Cited

U.S. PATENT DOCUMENTS

| | | | |
|---|---|---|---|
| 5,825,031 A | 10/1998 | Wong et al. ........... 250/363.03 |
| 6,388,244 B1 | 5/2002 | Gagnon .................... 250/208.1 |
| 6,744,053 B2* | 6/2004 | Wong et al. ................. 250/394 |
| 6,808,308 B2* | 10/2004 | Thompson .................. 378/203 |
| 2002/0148970 A1 | 10/2002 | Wong et al. ................. 250/394 |
| 2003/0058984 A1 | 3/2003 | Susami et al. ................ 378/19 |
| 2003/0058997 A1* | 3/2003 | Thompson .................. 378/203 |
| 2004/0195512 A1 | 10/2004 | Crosetto ................ 250/363.04 |

OTHER PUBLICATIONS

NeuroShield® from Scanwell Systems Located at http://www3.sympatico.ca/scanwell/.

* cited by examiner

*Primary Examiner*—David P. Porta
*Assistant Examiner*—Mark R Gaworecki

(57) ABSTRACT

A radiographic imaging system (10) includes an array of detectors (16) arranged around a circular bore (18). A subject (14) is injected with a radioisotope. The subject (14), supported by a subject support means (12), is to be placed into the bore (18) for an examination. A fixed, non-circular shield (38) is rigidly mounted to one of an entrance (40) and an exit (42) of the bore (18) to prevent emission radiation originating outside of the bore (18) to reach the radiation detectors (16). The shield (38) extends from an outer periphery of the bore (18) toward and surrounding a central axis of the bore (18) and defines a fixed, non-circular subject receiving aperture (36). The shield (38) is tailored to a contour of the subject support and the subject (14) to permit the subject of a maximum girth to be received in the fixed, non-circular aperture (36).

22 Claims, 3 Drawing Sheets

IMAGE SYSTEM WITH NON-CIRCULAR PATIENT APERTURE

CROSS REFERENCE TO RELATED APPLICATION

This application claims the benefit of U.S. provisional application Ser. No. 60/501,200 filed Sep. 8, 2003, which is incorporated herein by reference.

The present invention relates to the diagnostic imaging systems and methods. It finds particular application in conjunction with the Positron Emission Tomography (PET) scanners and will be described with particular reference thereto. It will be appreciated that the invention is also applicable to other radiological scanners and the like.

PET is a valuable patient imaging scanner employing positron emitting compounds. PET provides specific metabolic information about tissues that conventional scanners such as CT and MRI can not provide. Typically, PET scanners include a circular bore that is surrounded by a circular array of detectors which detect concurrent energy events. Prior to the scan, the patient is injected with a positron emitting radioisotope which is taken up by cells. When a positron emits from a radioisotope, it combines with an electron to produce an annihilation reaction, in which the pair's mass is converted into energy. The energy is dispersed in the form of two 511 kev gamma rays or photons, traveling 180 degrees apart. When two detectors "see" 511 kev photons from the annihilation event concurrently or within nanoseconds of each other, the detectors register a coincidence along the line between the detector points—a line of response (LOR). The PET system draws lines of responses between each detection pair, registering coincidence events during the scan. When the scan is completed, there are areas of overlapping lines that indicate more concentrated areas of radioactivity. The system uses this information to reconstruct a three dimensional image of radioisotope concentration in the body.

The scanner accepts photons from anywhere from the field of view, and, in addition, accepts photons originating outside of field of view that into travel into the field of view. The photons originating outside of the field of view do not contain useful information that is used in image reconstruction. Note that one of the 180° opposite photons for a point outside the field of view normally cannot strike the detector. Typically, the PET systems are designed to only accept coincidence events within a narrow window. Problems arise when trying to run the scanner in a high flux photon situation where the total activity seen by the system is high. The higher the number of photons detected per unit time, the higher the probability that not-paired photons will be detected within the coincidence time window. The systems performance degrades with high activity levels in patient bodies. This becomes an issue when the patient is injected with the radioisotopes having a short half life which is not enough to obtain sufficient valid counts because of detection errors attributable to high flux. By shielding the detectors from out of the field of view events, the total flux across the system can be lowered while not reducing the useful true coincidences from the target organ occurring in the window of acceptance. Having lowered the total flux, more tracings can be used resulting in a higher number of true coincidence events being recorded from the organ of interest in the window of acceptance for a particular amount of the radioisotope injected.

Typically, the shield is a lead flange at the entrance and exit of the PET scanner bore. The flange extends from the outer periphery of the bore toward the central axis of the bore and leaves a circular patient aperture of about 50-60 cm in diameter. Although it is important to shield as much as possible, the smaller opening presents a problem when the larger patients do not fit through it, while the larger opening does not provide an effective shielding.

There is a need for a shielding for the PET scanners that better conforms to the patient's contour and provides effective shielding, yet is inexpensive and easy to handle. The present invention provides a new and improved imaging apparatus and method which overcomes the above-referenced problems and others.

In accordance with one aspect of the present invention, a radiographic imaging system is disclosed. A means detects emission radiation emitted by a radioisotope injected into a subject, the detecting means arranged around a circular bore, which has an entrance and an exit. A means shields the detecting means from the emission radiation originating outside of the bore. The shielding means includes at least one rigid radiation opaque shield rigidly mounted to one of the entrance and the exit of the bore. The shield extends from an outer periphery of the bore toward and surrounding a central axis of the bore and defining a fixed non-circular subject receiving aperture.

In accordance with another aspect of the present invention, a method of radiographic imaging is disclosed. Emission radiation, which is emitted by a radioisotope injected into a subject, is detected along a detecting means defined around a circularly cylindrical bore. The detecting means is shielded from the emission radiation originating outside of the bore with at least one shield rigidly mounted to one of an entrance and an exit of the bore and extending from an outer periphery of the bore toward and surrounding a central axis of the bore. The at least one shield defines a fixed non-circular subject receiving aperture.

One advantage of the present invention resides in reducing out-of-the- field-of-view events reaching the detectors.

Another advantage of the present invention resides in fitting radiation shielding to the patient, yet providing an easy to maintain and inexpensive shielding.

Another advantage of the present invention resides in its mechanical simplicity and lack of moving parts.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not be construed as limiting the invention.

Figure 1:
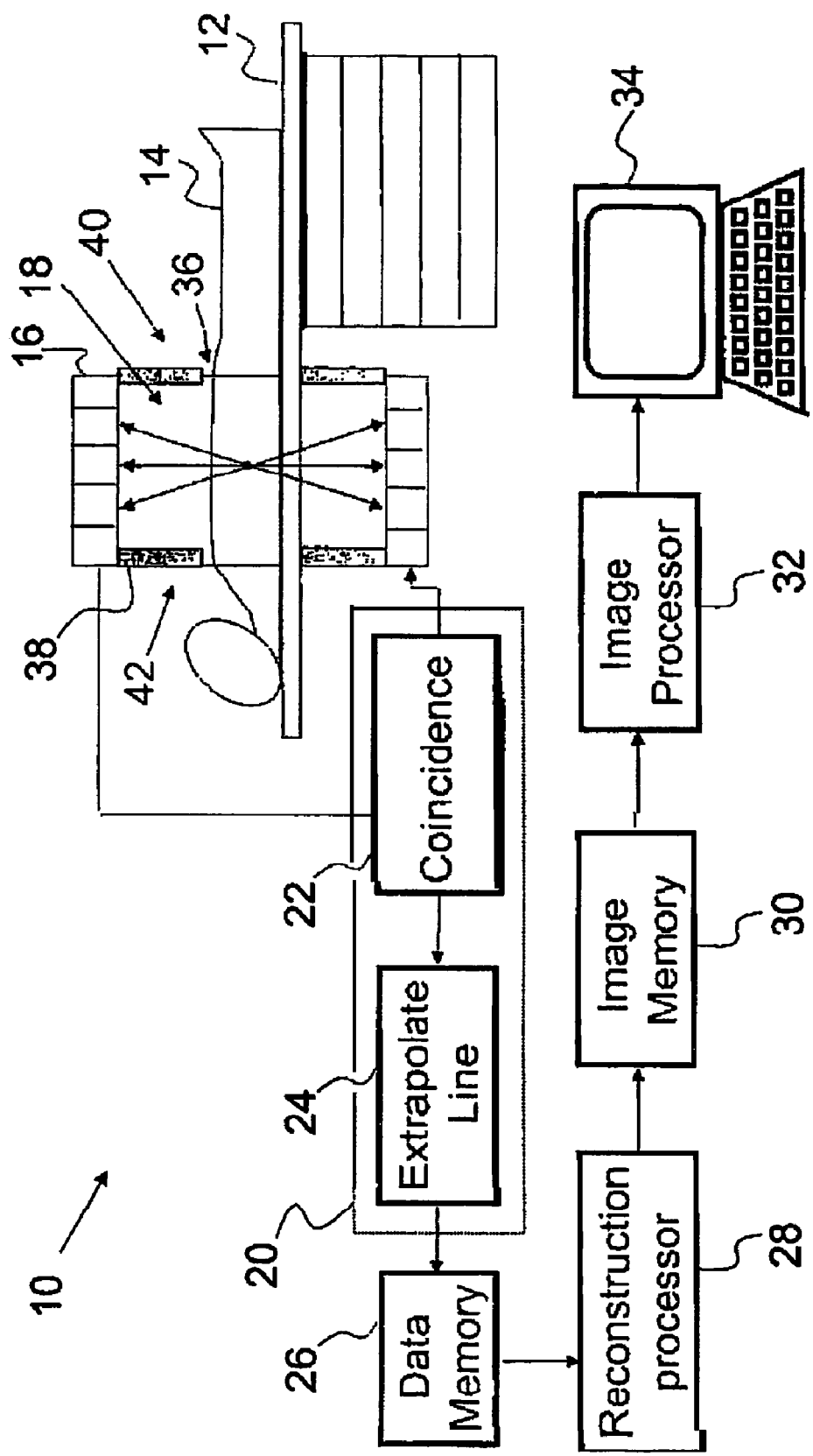
FIG. 1 is a diagrammatic illustration of a PET imaging system in accordance with present invention.

With reference to FIG. 1, an imaging system 10 includes a subject support means 12, such as a table or couch, which supports a subject 14 being imaged. The subject 14 is injected with one or more radioisotopes to induce the emission of the positron. An annular array of detectors 16 is arranged around a circular bore 18. Because the detectors may have planar faces the detector array 16 may be an octagon or other regular polygon that approximates a circle. The subject support 12 is advanced and retracted to achieve the desired positioning of the subject 14 within the bore 18, e.g. with the region of interest centered in the field of view of the detectors. Radiation events detected by detectors 16 are collected by a line of response (LOR) calculating circuit 20. The LOR calculator 20 includes a coincidence detector 22 that determines when two events are within a preselected temporal window of being simultaneous. From the position of the detectors 16 and the position within each detector, at which the coincident radiation was received, a ray between the radiation detection points is calculated by line extrapolator 24.

The acquired LOR data are preferably stored in a data memory or buffer 26. A data reconstruction processor 28 reconstructs an electronic image representation from the LOR data stored in data memory 26 and stores the resultant image representation in an image memory 30. Portions of the stored image representation are retrieved by an image processor 32 and converted to an appropriate format for display on a monitor 34, such as a video, CCD, active matrix, or other monitor. Of course, a color printer or other output device may also be used to present the data in a convenient format.

Figure 2:
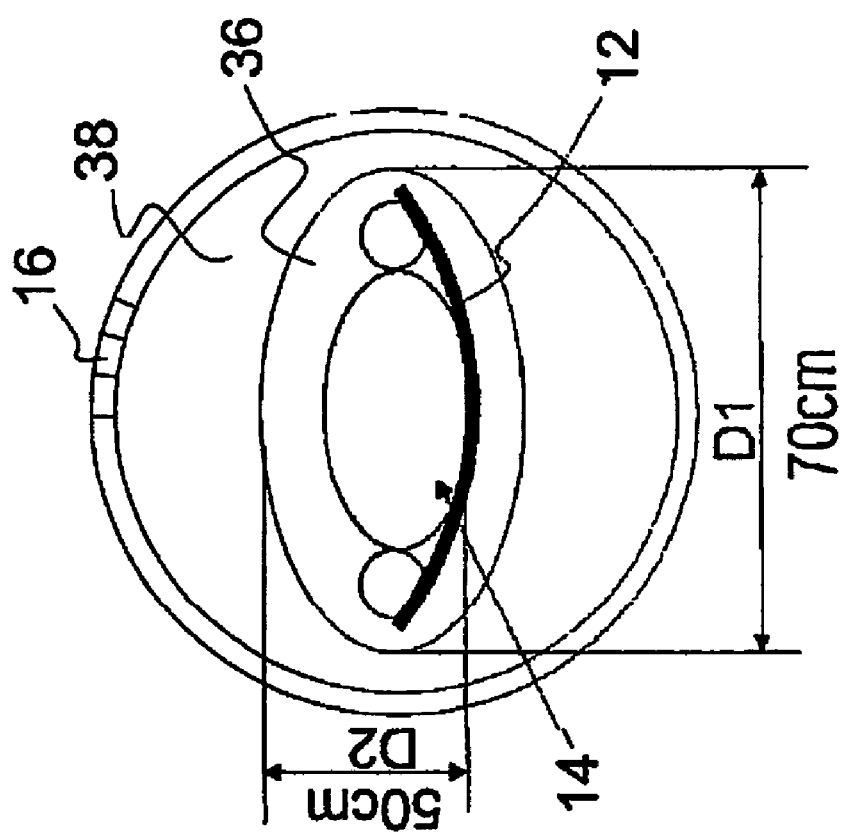
FIG. 2 is a diagrammatic illustration of a non-circular subject receiving aperture in a shape of an ellipse.

With continuing reference to FIG. 1 and further reference to FIG. 2, a non-circular receiving area or aperture 36 of the PET scanner is defined by radiation shields 38 mounted at the entrance and exit of the circular bore 18 and extending from an outer periphery of the bore 18. The shields 38 are manufactured from a LEAD or other high density shielding material and is up to 25 mm thick. The aperture 36 has a larger dimension D1 along the axis substantially parallel to the horizontal, transverse axis drawn through the shorter dimension of the couch 12. In the preferred embodiment, the aperture 36 is an ellipse, with the larger dimension or major axis D1 equal to 70 cm. The aperture 36 has a smaller dimension or minor axis D2 along the vertical axis perpendicular to the axis drawn through the shorter dimension of the couch 12. In the preferred embodiment, the smaller dimension D2 of oval aperture 36 is 50 cm. More specifically, aperture is sized such that a nominally sized subject centered in the aperture is generally equidistant from the shield in all directions.

Figure 3:
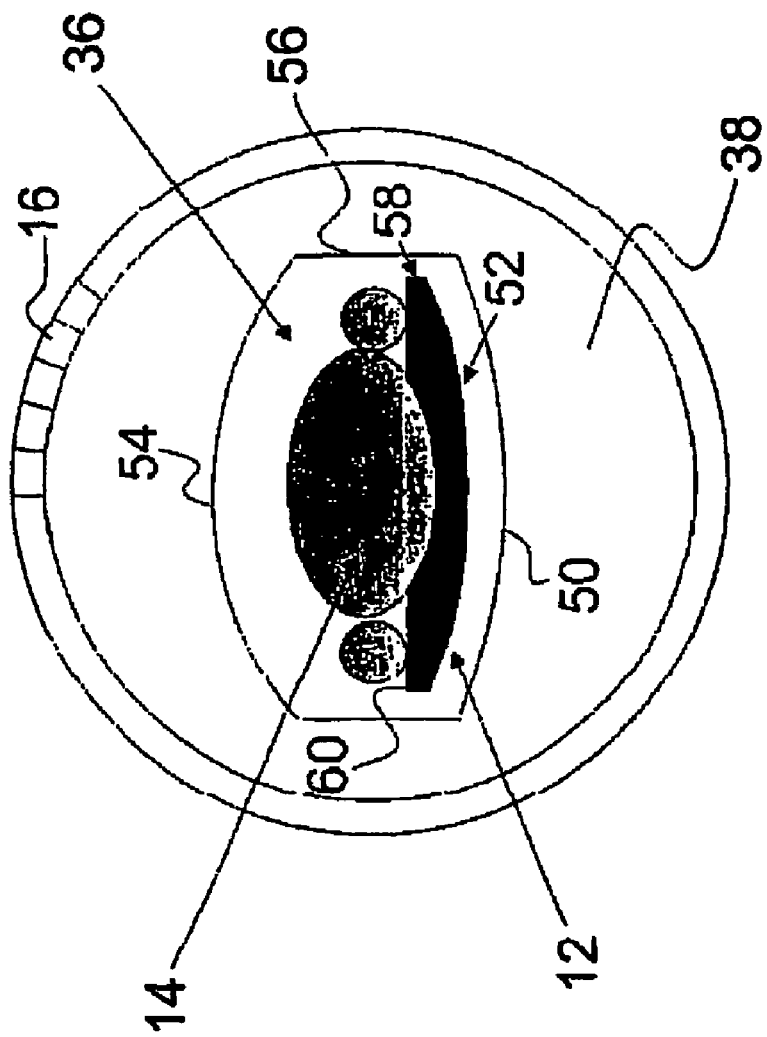
FIG. 3 is a diagrammatic illustration of a non-circular subject receiving aperture tailored to the couch.

With reference to the embodiment of FIG. 3, the PET scanner has a radiation shield 38 mounted at the entrance 40 and exit 42 of the circular bore 18, which defines a non-circular aperture 36. A bottom boundary 50 of aperture 36 is disposed underneath the couch 12 and follows closely the shape of a bottom surface 52 of the couch 12. When the couch 12 is in a lower most position, there is no substantial air gap between the aperture bottom boundary 50 and the bottom surface 52 of couch 12. A top boundary 54 of aperture 36 formed by shield 38 is positioned above the subject 14. Preferably, it is curved to allow the subject 14 of maximum girth to be received in the subject receiving aperture 36 with the couch 12 in the lower most position. Side boundaries or sides 56 are formed between the top and bottom boundaries of aperture 36. The sides 56 of the aperture 36 are linear vertical segments, which are closely adjacent the sides 58 of couch 12 and extend a vertical distance commensurate with the permitted vertical travel of the couch 12. Preferably, the sides 56 transition into the top boundary 54 with curved surfaces that conform to an upper side contour of the subject 14. Preferably, there is no substantial air gap between the aperture sides 56 and the sides 58 of couch 12 as well as between the aperture sides 56 and the sides of a maximum width of subject 14.

The invention has been described with reference to the preferred embodiments. Modifications and alterations may occur to others upon a reading and understanding of the preceding detailed description. It is intended that the invention be constructed as including all such modifications and alterations insofar as they come within the scope of the appended claims or the equivalents thereof.

The invention claimed is:

1. A radiographic imaging system comprising:
   a means for detecting emission radiation emitted by a radioisotope injected into a subject, the detecting means arranged around a circular bore, the bore having an entrance and an exit;
   a means for shielding the detecting means from the emission radiation originating outside of the bore, the shielding means including at least one rigid radiation opaque shield rigidly mounted to one of the entrance and the exit of the bore, the shield extending from an outer periphery of the bore toward and surrounding a central axis of the bore and defining a fixed non-circular subject receiving aperture; and
   a subject support means that support the subject in the aperture, the subject support means including:
     a top surface on which the subject is positioned;
     a bottom surface opposing the top surface and having a shape,
     a pair of side surfaces opposing each other and each disposed between the bottom and the top surfaces;
   wherein at least one shield defines a bottom boundary of the aperture disposed underneath the support means, which bottom boundary conforms to the shape of the bottom surface.

2. The imaging system according to claim 1, wherein the aperture of the at least one shield is elliptical.

3. The imaging system according to claim 2, wherein the elliptical aperture has a horizontal major axis and a vertical minor axis.

4. The imaging system according to claim 3, wherein a ratio of the major axis to the minor axis is or about 7 to 5.

5. The imaging system according to claim 1, wherein the subject support means is vertically adjustable and no substantial air gap is defined between the aperture bottom boundary and the bottom surface of the subject support means when the subject support means is in a lower most position.

6. The imaging system according to claim 1, wherein each shield defines a top curved boundary of the aperture disposed above the subject support means.

7. The imaging system according to claim 6, wherein each shield defines a pair of opposing side boundaries of the aperture, each side boundary disposed between the bottom and top boundaries of the aperture.

8. The imaging system according to claim 7, wherein the aperture side boundaries are curved.

9. The imaging system according to claim 7, wherein the aperture side boundaries include linear vertical surfaces, which conform to a path of vertical travel of the side surfaces of the subject support means and the subject.

10. The imaging system according to claim 9, wherein there is no substantial air gap between each side boundary of the aperture and an associated side surface of the subject support means.

11. The imaging system according to claim 9, wherein there is no substantial air gap between side boundaries of the aperture and the subject.

12. The imaging system according to claim 7, wherein:
    the bottom boundary of the aperture is substantially parallel to the bottom surface of the subject support means, and each side boundary of the aperture is substantially parallel to an associated side surface of the subject support means.

13. The imaging system according to claim 1, wherein:
at least one of the shields is a plate of radiation opaque material which is non-movably mounted about the bore.

14. The imaging system according to claim 1, wherein the emission radiation detecting means includes a plurality of detectors mounted around the circular bore and further including:
a coincidence detecting means for determining when two of the detectors detect emitted radiation within a preselected temporal window of being simultaneous.

15. A method of radiographic imaging comprising:
detecting emission radiation emitted by a radioisotope injected into a subject along a detecting means defined around a circularly cylindrical bore; and
shielding the detecting means from the emission radiation originating outside of the bore with at least one shield rigidly mounted to one of an entrance and an exit of the bore and extending from an outer periphery of the bore toward and surrounding a central axis of the bore and defining a fixed non-circular subject receiving aperture that includes inwardly facing first and second side boundaries that face corresponding first and second outwardly facing sides of a subject support that supports the subject in the bore, wherein there is no substantial air gap between each side boundary of the aperture and the corresponding side of the subject support.

16. A method of shielding a radiographic scanner, which has an elongated circular bore extending between first and second bore ends and surrounded by an array of radiation detectors, from radiation originating outside of the bore, the method comprising:
shaping a unitary piece of radiation opaque material into a one-piece shield with an outer periphery that closes one of the bore ends and a central non-circular aperture which mimics a cross section of a received subject; and
rigidly mounting the shield to the one bore end to permit a subject to be imaged in the scanner bore to pass into and out of the bore through the non-circular aperture, wherein the radiographic scanner includes a subject support, which supports the subject in the bore, wherein the subject support moves vertically to raise and lower the subject in the bore and further including:
shaping a pair of opposing side boundaries of the aperture with linear and vertical regions to accommodate vertical movement of the subject support.

17. The method according to claim 16, wherein the aperture is elliptical.

18. The method according to claim 16, the subject support moves the subject longitudinally into and out of the bore through the non-circular aperture, the method further including:
shaping a bottom boundary of the non-circular aperture to conform to a shape of a bottom surface of the subject support.

19. The method according to claim 18, further including:
shaping a top boundary of the aperture disposed above the subject support means arcuately with a different curvature from the bottom boundary.

20. The method according to claim 16, further including:
positioning a subject on a subject support;
injecting the subject with a radiopharmaceutical;
moving the subject support to position a region of interest of the subject in an isocenter of the bore and other regions of the subject outside of the bore; and detecting radiation from the radiopharmaceutical within the region of interest with the array of radiation detectors, while concurrently blocking radiation from the radiopharmaceutical in the regions of the subject outside the bore from reaching the radiation detectors with the radiation opaque shield.

21. A diagnostic imaging system comprising:
a plurality of emission radiation detectors arranged to define an imaging region;
a radiation shield positioned at least one end of the imaging region, wherein said radiation shield includes a non-circular subject receiving aperture;
a subject support that supports a subject in the imaging region, wherein the subject support includes:
an upper surface that supports the subject;
a lower surface opposite the upper surface and having a shape, wherein the aperture includes an upper portion that faces the upper surface and a lower portion that faces the lower surface, the shape of the lower portion conforms to the shape of the lower surface, and the shape of the upper portion has a shape that is different from the shape of the lower surface.

22. The system of claim 21 wherein the aperture includes first and second side portions that extend vertically between the upper and lower portions and the upper portion is arcuate.

* * * * *